(12) United States Patent
Cheng et al.

(10) Patent No.: US 10,431,824 B2
(45) Date of Patent: Oct. 1, 2019

(54) NEGATIVE ELECTRODE CARBON MATERIAL, METHOD FOR PRODUCING NEGATIVE ELECTRODE CARBON MATERIAL, NEGATIVE ELECTRODE FOR LITHIUM SECONDARY BATTERY, AND LITHIUM SECONDARY BATTERY

(71) Applicant: NEC Corporation, Tokyo (JP)

(72) Inventors: Qian Cheng, Tokyo (JP); Noriyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 15/127,293

(22) PCT Filed: Mar. 23, 2015

(86) PCT No.: PCT/JP2015/058707
§ 371 (c)(1),
(2) Date: Sep. 19, 2016

(87) PCT Pub. No.: WO2015/146900
PCT Pub. Date: Oct. 1, 2015

(65) Prior Publication Data
US 2017/0133680 A1     May 11, 2017

(30) Foreign Application Priority Data

Mar. 26, 2014  (JP) ................ 2014-063287

(51) Int. Cl.
*H01M 4/587*    (2010.01)
*B01J 13/04*    (2006.01)
(Continued)

(52) U.S. Cl.
CPC ............ *H01M 4/587* (2013.01); *B01J 13/04* (2013.01); *C01B 32/20* (2017.08); *H01M 4/366* (2013.01);
(Continued)

(58) Field of Classification Search
CPC ........ H01M 4/587; H01M 4/36; H01M 4/366; H01M 10/052; H01M 2004/021;
(Continued)

(56) References Cited

U.S. PATENT DOCUMENTS 6,576,369 B1 * 6/2003 Moriguchi ............ H01M 4/133
                                                    423/448
6,803,150 B1 * 10/2004 Iriyama ................ H01M 2/0222
                                                    252/502
8,580,432 B2 * 11/2013 Zhamu ................. H01M 4/133
                                                    252/182.1

FOREIGN PATENT DOCUMENTS

EP    0890549 A1    1/1999
JP    H10-040914    2/1998
(Continued)

OTHER PUBLICATIONS

International Search Report, Corresponding to PCT/JP2015/058707, dated May 19, 2015, 2pp.
(Continued)

*Primary Examiner* — Alexander Usyatinsky
(74) *Attorney, Agent, or Firm* — Wilmer Cutler Pickering Hale and Dorr LLP

(57) ABSTRACT

In order to provide a negative electrode carbon material capable of providing a lithium secondary battery improved in the capacity and the rate characteristic, there are carried out a first heat treatment of subjecting graphite particles to a heat treatment in an oxidizing atmosphere, and following the first heat treatment, a second heat treatment of subjecting the resulting graphite particles to a heat treatment in an inert gas atmosphere at a higher temperature than in the first heat treatment.

8 Claims, 9 Drawing Sheets

(51) Int. Cl.
  *H01M 4/36* (2006.01)
  *H01M 10/052* (2010.01)
  *C01B 32/20* (2017.01)
  *H01M 4/02* (2006.01)

(52) U.S. Cl.
  CPC ....... *H01M 10/052* (2013.01); *C01P 2004/20* (2013.01); *C01P 2004/80* (2013.01); *C01P 2006/12* (2013.01); *C01P 2006/40* (2013.01); *H01M 2004/021* (2013.01); *H01M 2004/027* (2013.01); *Y02T 10/7011* (2013.01)

(58) Field of Classification Search
  CPC ... H01M 2004/027; B01J 13/04; C01B 32/20; C01P 2004/20; C01P 2006/12; C01P 2006/40; C01P 2004/80; Y02T 10/7011
  See application file for complete search history.

(56) References Cited

FOREIGN PATENT DOCUMENTS

| | | |
|---|---|---|
| JP | 2000-228193 A | 8/2000 |
| JP | 2001-273894 A | 10/2001 |
| JP | 2002-075362 A | 3/2002 |
| JP | 2003-272625 A | 9/2003 |
| JP | 2004-055505 A | 2/2004 |
| JP | 2013-118138 A | 6/2013 |
| JP | 2015-109255 A | 6/2015 |
| WO | WO-98/29335 A1 | 7/1998 |
| WO | WO-00/13245 A1 | 3/2000 |
| WO | WO-2013/018181 A1 | 2/2013 |
| WO | WO-2014/157630 A1 | 10/2014 |

OTHER PUBLICATIONS

Partial Supplementary European Search Report issued by the European Patent for European Application No. 15768792.2 dated Jul. 17, 2017 (15 pages).

Decision to Grant a Patent dated Feb. 19, 2019 received in related Japanese Patent Application No. 2016-510330 (4 pages).

Notification of Reasons for Refusal issued by the Japan Patent Office for Japanese Application No. 2016-510330 dated Dec. 4, 2018 (5 pages).

* cited by examiner

[Fig. 1]
(a)
(b)
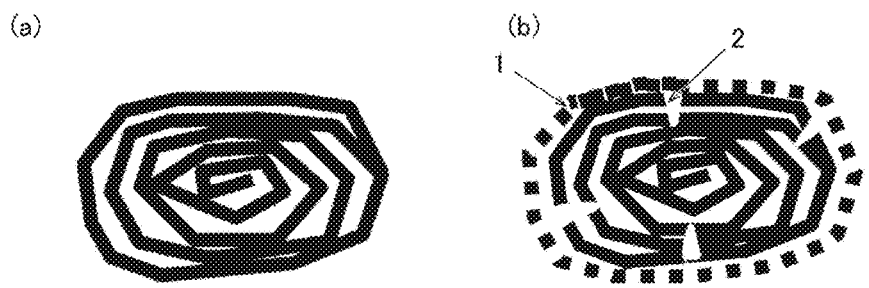
[Fig. 2]
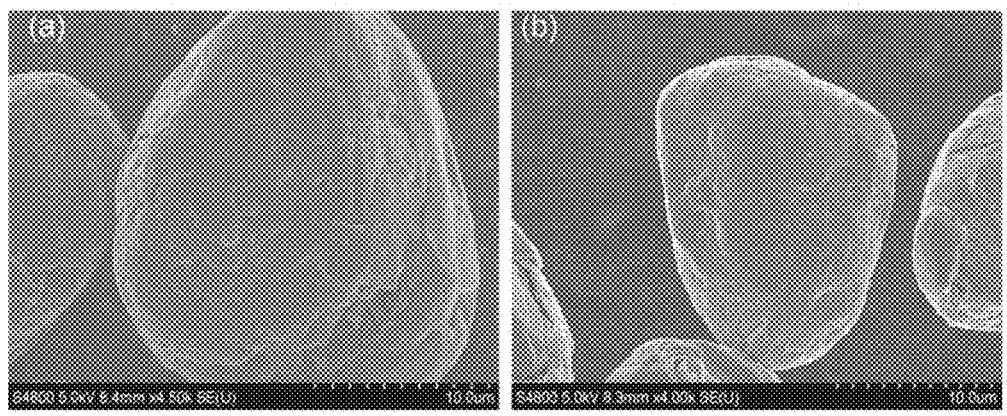

[Fig. 3]
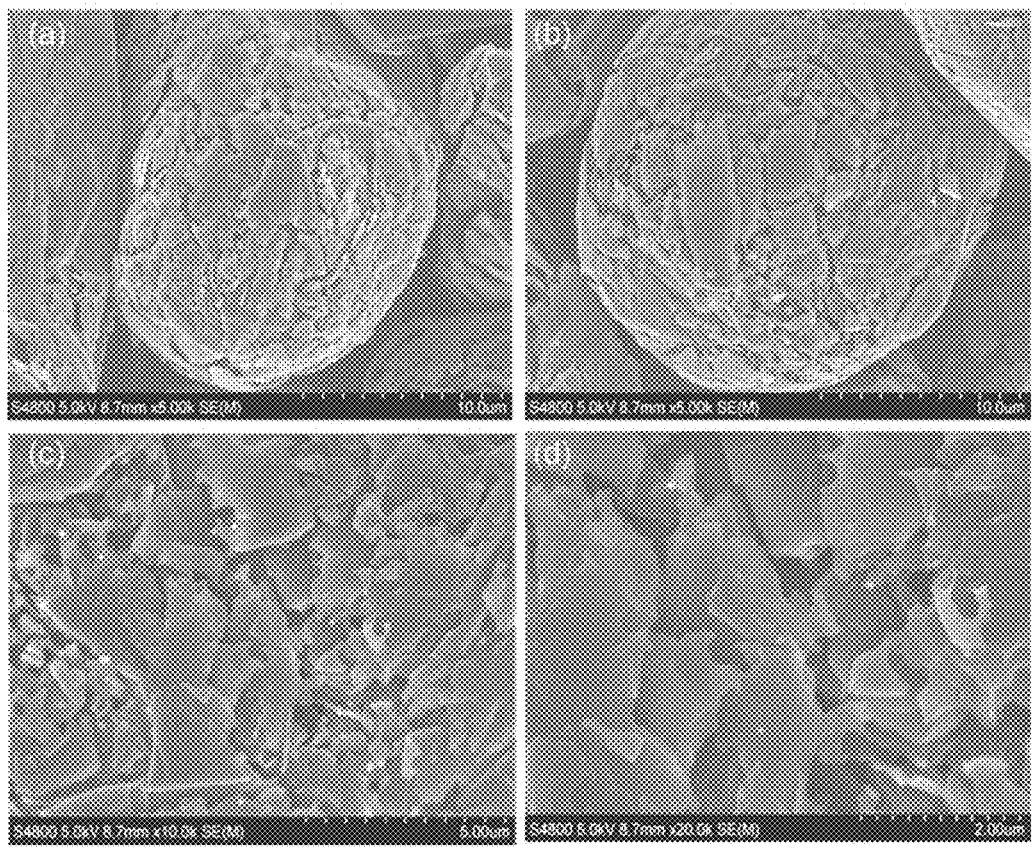

[Fig. 4]
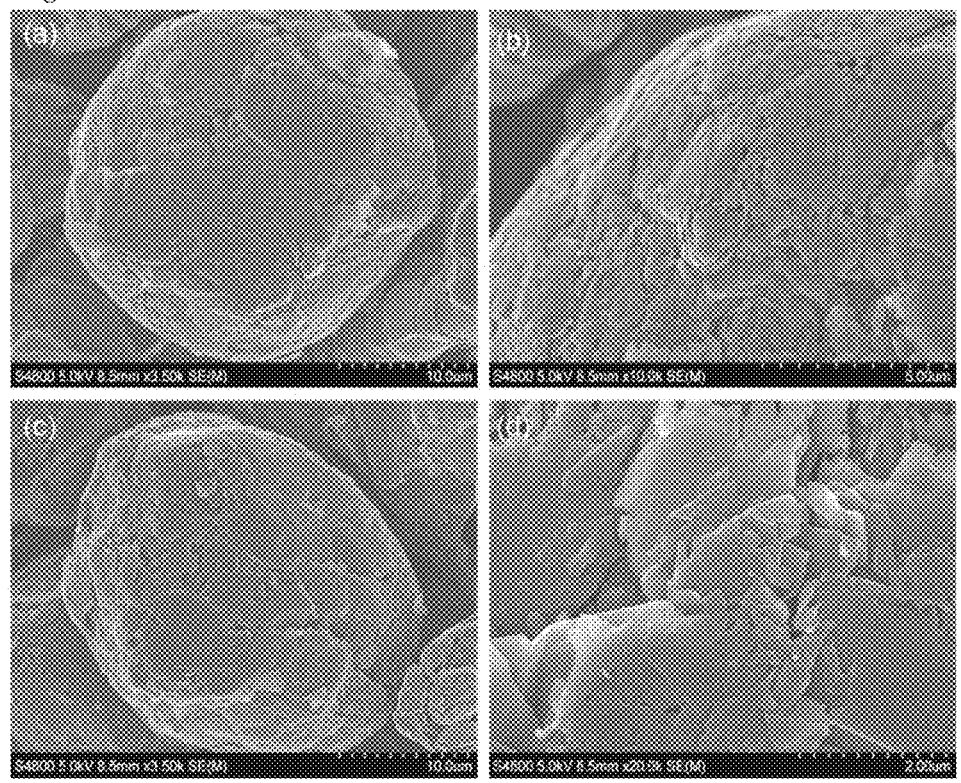
[Fig. 5]
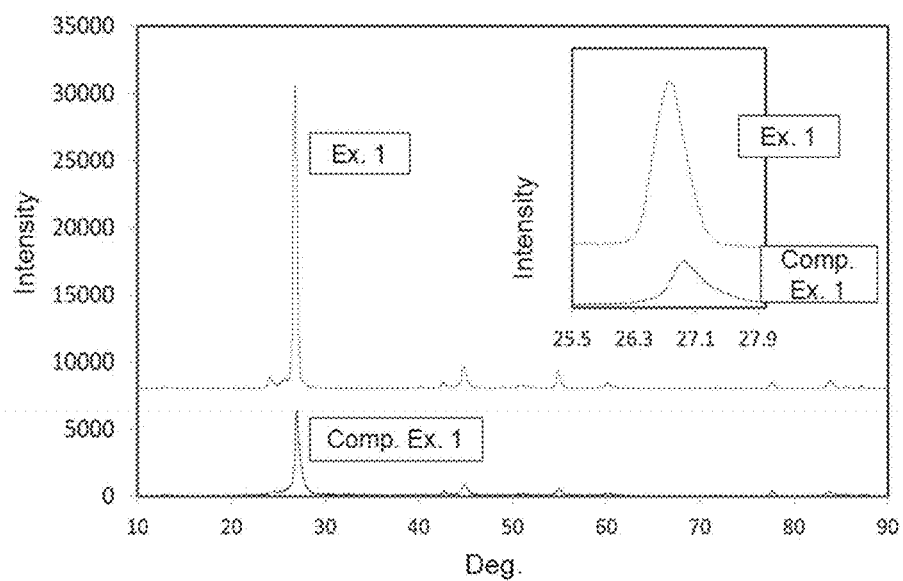

[Fig. 6]
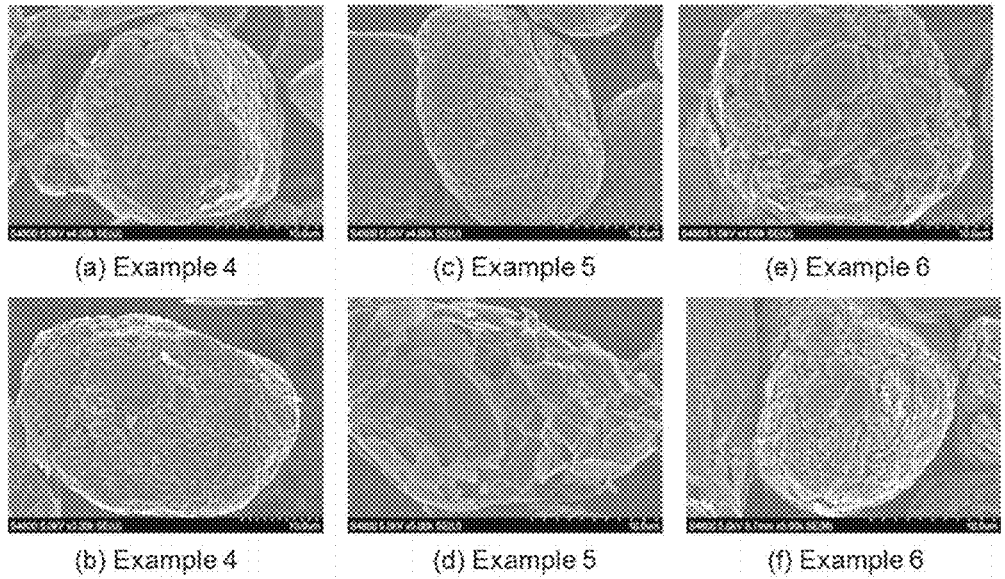
[Fig. 7]
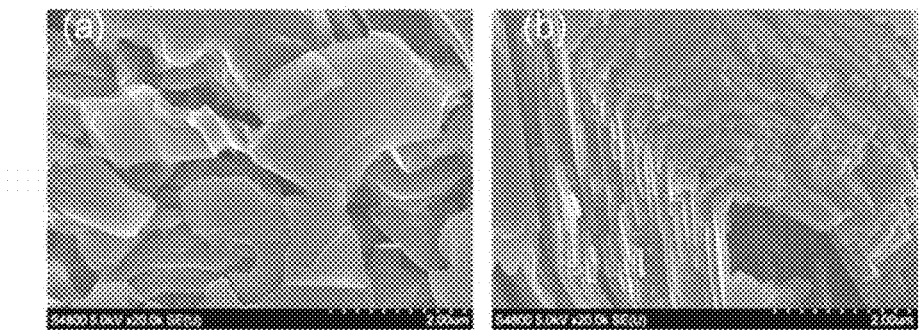

[Fig. 8]
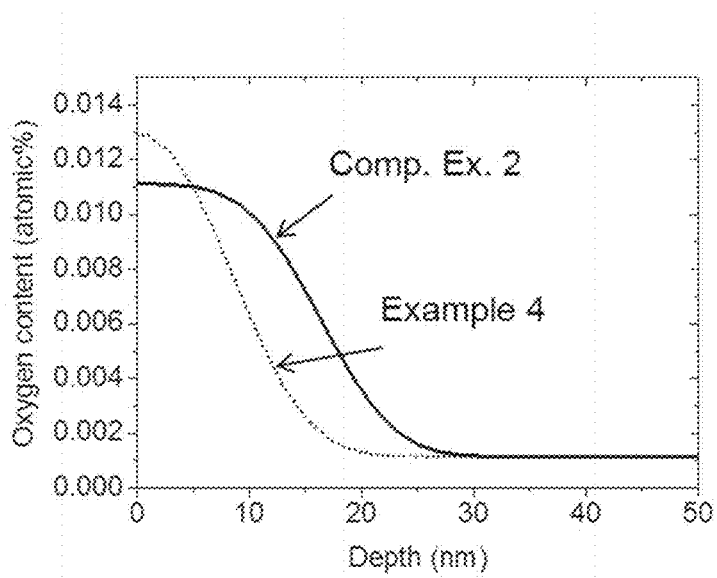
[Fig. 9]
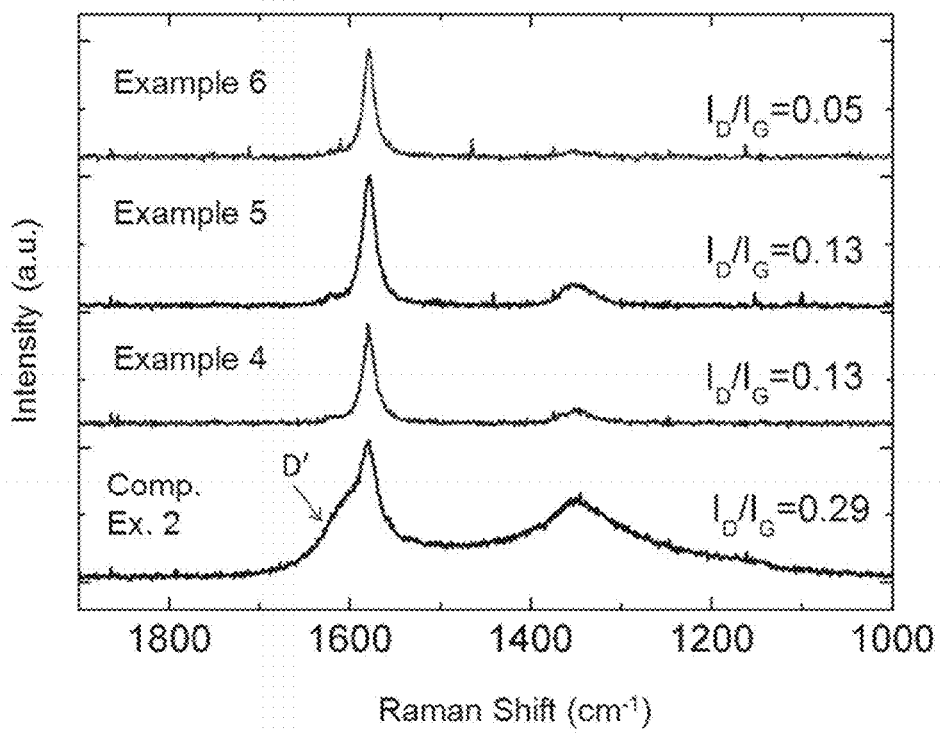

[Fig. 10]
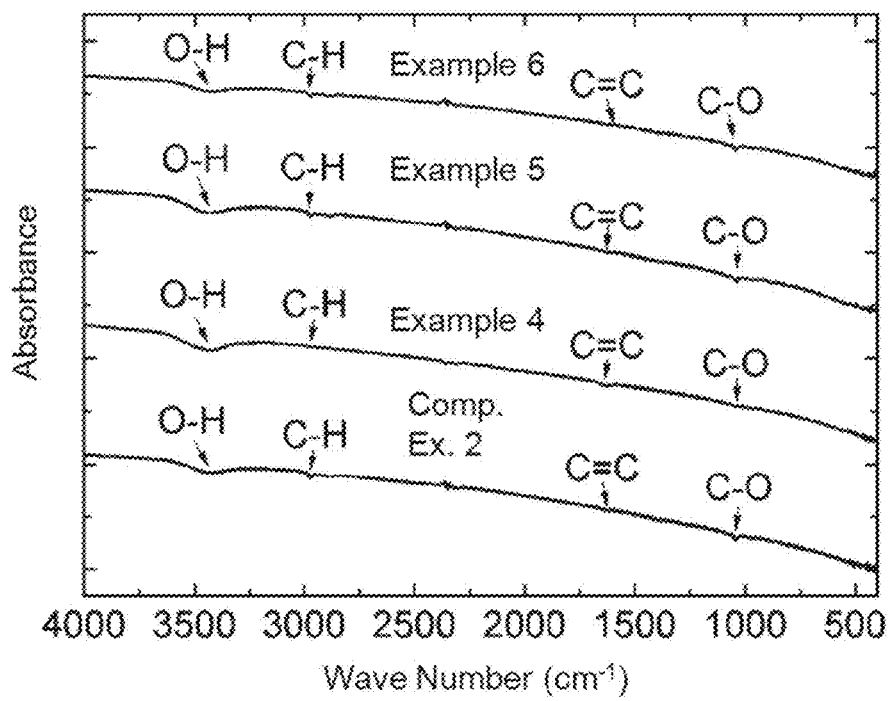
[Fig. 11]
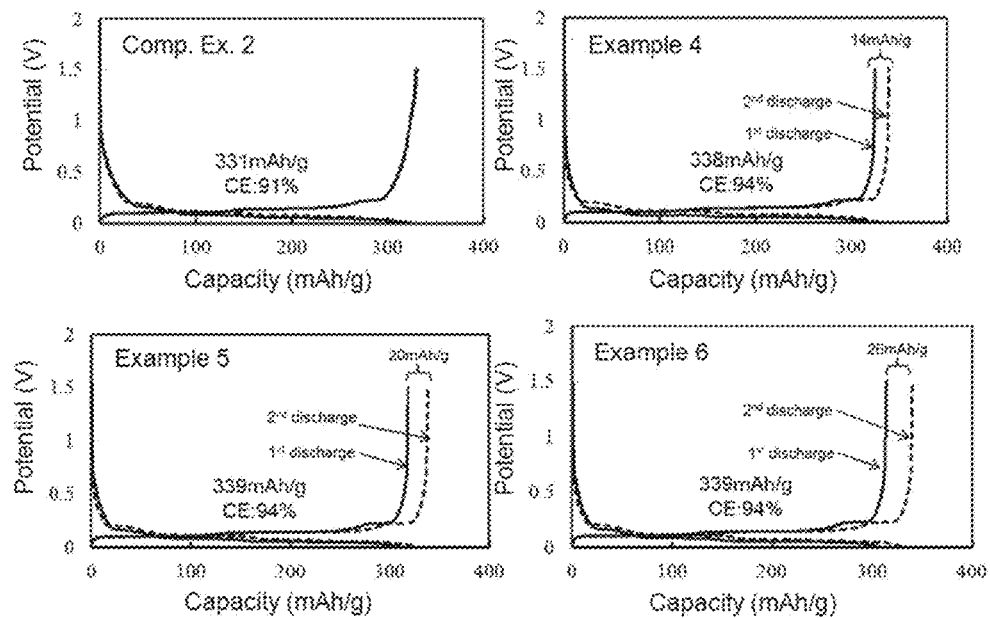

[Fig. 12]
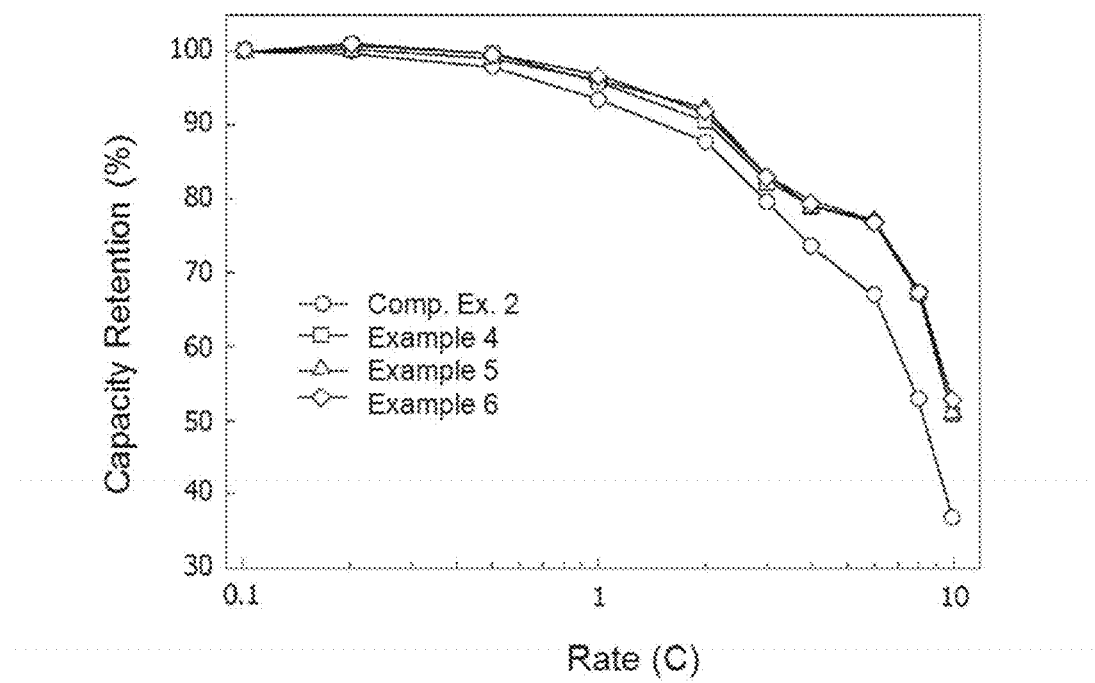
[Fig. 13]
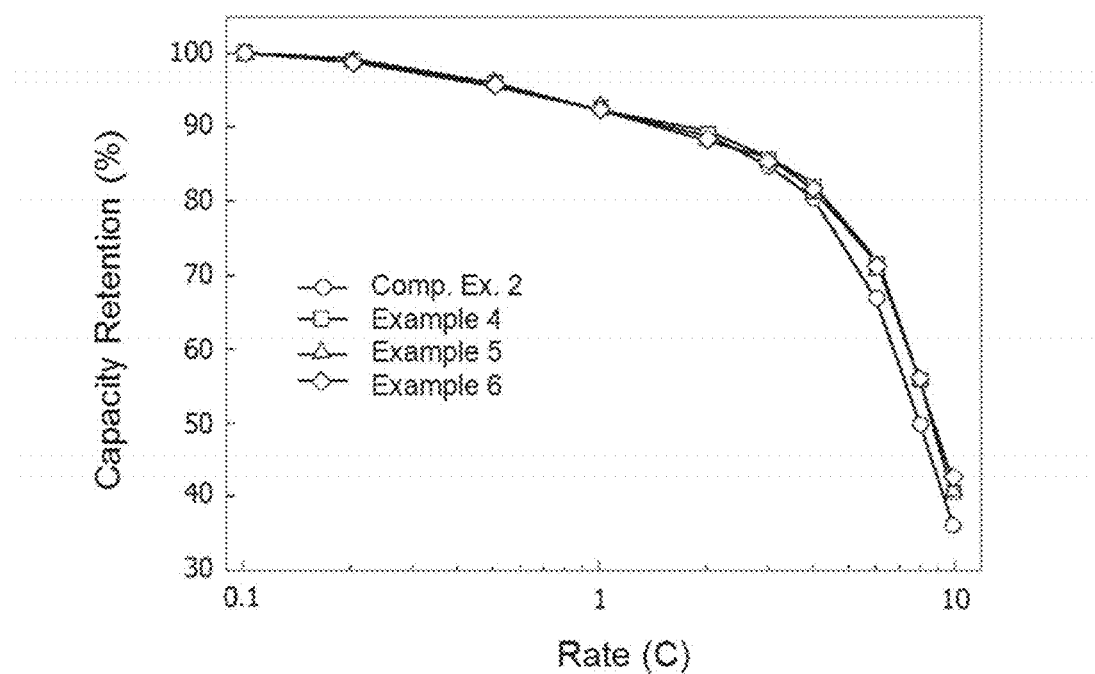

[Fig. 14]
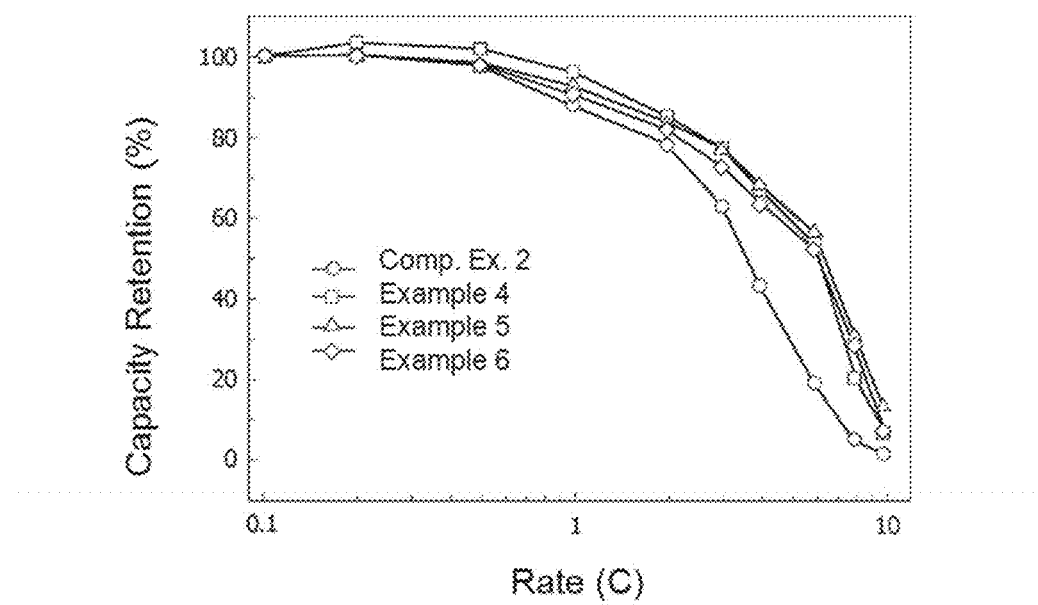
[Fig. 15]
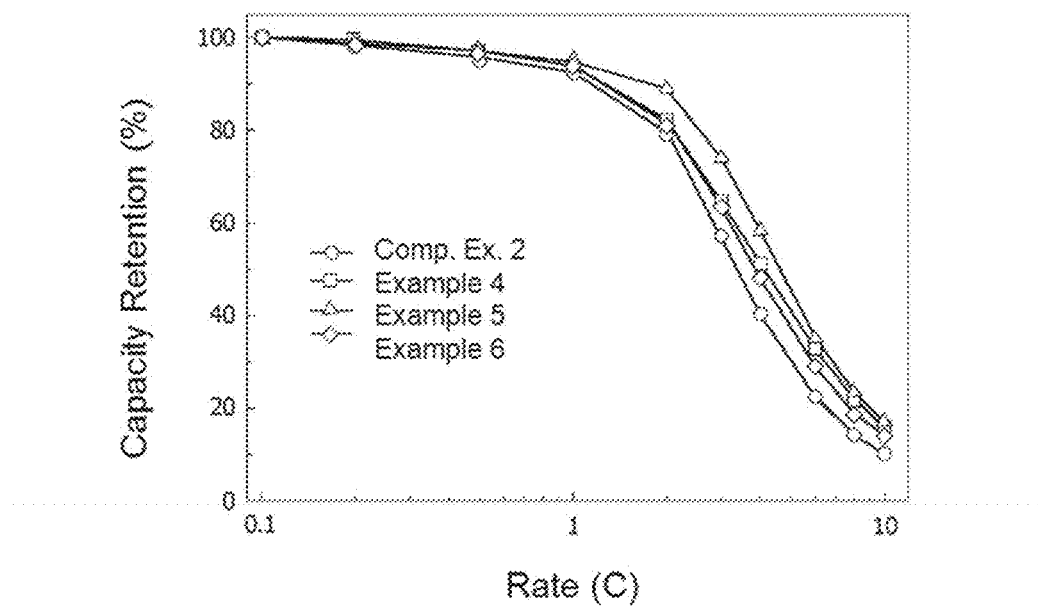

[Fig. 16]
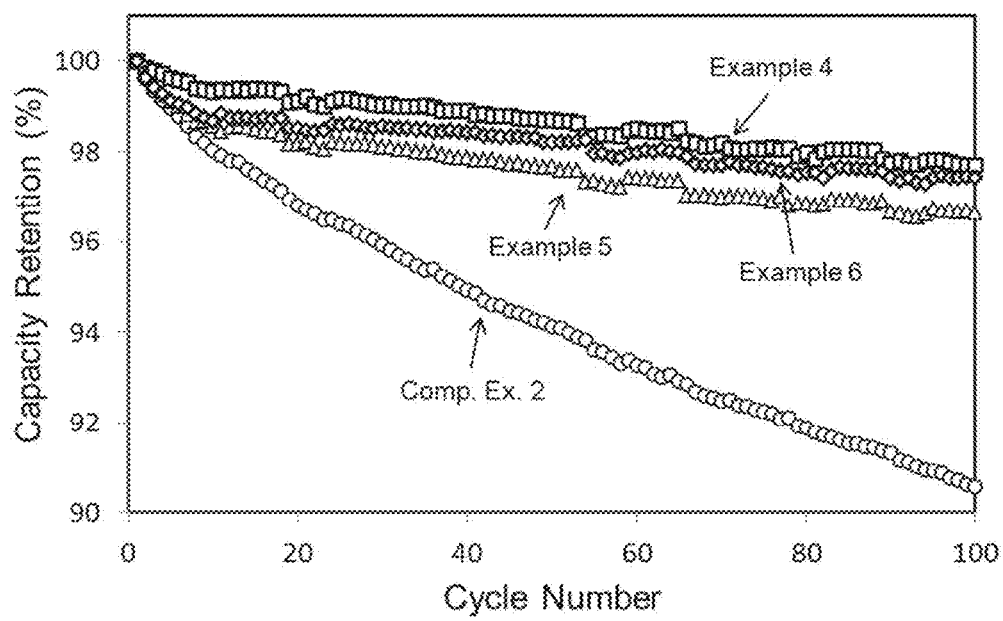
[Fig. 17]
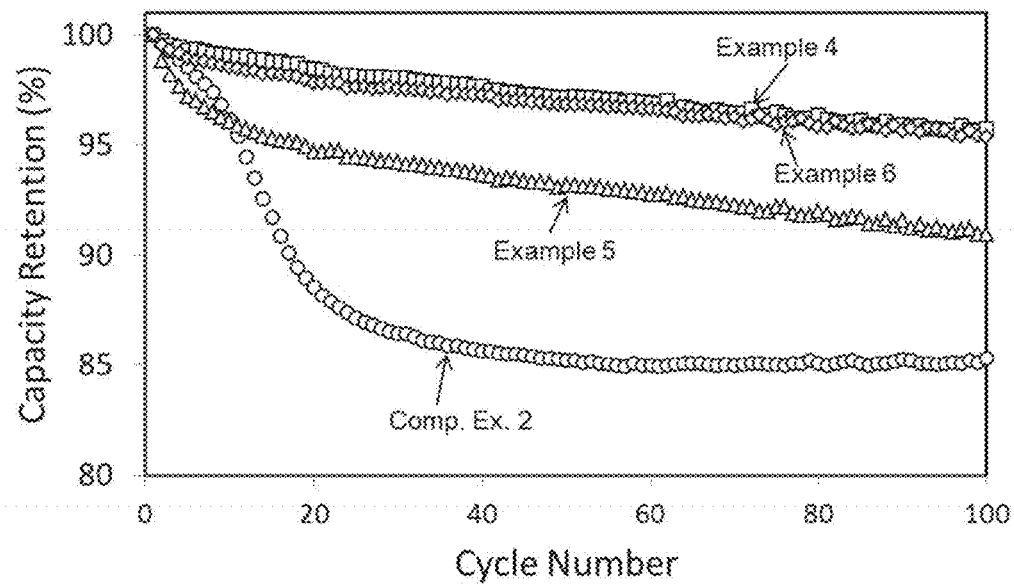

NEGATIVE ELECTRODE CARBON MATERIAL, METHOD FOR PRODUCING NEGATIVE ELECTRODE CARBON MATERIAL, NEGATIVE ELECTRODE FOR LITHIUM SECONDARY BATTERY, AND LITHIUM SECONDARY BATTERY

CROSS-REFERENCE TO RELATED APPLICATIONS

The present application is a national stage application of International Application No. PCT/JP2015/058707 entitled "Negative Electrode Carbon Material, Method for Producing Negative Electrode Carbon Material, Negative Electrode for Lithium Secondary Battery, and Lithium Secondary Battery," filed on July Mar. 23, 2015, which claims the benefit of priority from Japanese Patent Application No. JP2014-063287, filed on Mar. 26, 2014, the disclosures of which are incorporated herein in their entirety by reference thereto.

TECHNICAL FIELD

The present invention relates to a method for producing a negative electrode carbon material for a lithium secondary battery. The present invention relates also to a negative electrode carbon material for a lithium secondary battery, a negative electrode for a lithium secondary battery, and a lithium secondary battery.

BACKGROUND ART

Lithium secondary batteries have the advantages of high energy density, little self-discharge, excellent long-term reliability and the like, and are therefore broadly put to practical use as batteries for small-size electronic devices such as notebook computers and cellular phones. In recent years, high functionalization of electronic devices and utilization of lithium secondary batteries for electric vehicles have progressed, and the development of higher-performance lithium secondary batteries is thus demanded.

At present, carbon materials are common as negative electrode active materials for lithium secondary batteries, and various types of carbon materials are proposed in order to improve the battery performance.

As the carbon materials, there are known high-crystallinity carbon such as natural graphite and artificial graphite, low-crystallinity carbon such as graphitizing carbon (soft carbon) and non-graphitizing carbon (hard carbon), and amorphous carbon. Graphite, which is a high-crystallinity carbon, is known to be excellent in the reactivity with Li ions and is capable of providing a capacity near to its theoretical capacity value. By contrast, the high-crystallinity carbon causes a decrease in the cycle characteristics due to the degradation of the electrolyte solutions, since it is liable to react with propylene carbonate (PC) often used as a solvent of electrolyte solutions. Low-crystallinity carbon and amorphous carbon, which have just a higher theoretical capacity value than that of graphite, are low in the reactivity with Li ions, then need charging for a long time, and have a lower capacity value per unit time than graphite. By contrast, the reactivity with PC is low and the degradation of electrolyte solutions is little. Then, there has been proposed a composite carbon material which includes the combination of a graphite and an amorphous carbon (including low-crystallinity carbon).

For example, Patent Literature 1 discloses a negative electrode active substance in which an amorphous carbon is adhered on the surface of graphite particles. The Patent Literature discloses that in order to improve the close adhesivity of the graphite particles with the amorphous carbon, the graphite particles are oxidatively treated to form oxygen-containing functional groups on the graphite particle surface, and that the surface thereof is roughened. For example, Patent Literature 1 discloses a method including oxidizing graphite particles with air at a temperature of 200 to 700° C., adhering an alkali on the graphite particle surface, and thereafter, subjecting the graphite particles to a heat treatment at 300° C. to 700° C.

CITATION LIST

Patent Literature

Patent Literature 1: JPH10-40914A

SUMMARY OF INVENTION

Technical Problem

According to studies by the present inventors, it has been found that when graphite is oxidized with air, there arises the problem of large decrease in the initial capacity. Further since the theoretical capacity value of amorphous carbon is higher than that of graphite, coating the amorphous carbon can be counted on for the recovery of the capacity to some degree. As disclosed in Patent Literature 1, however, even if an amorphous carbon is coated on graphite, the initial capacity is by far lower than 372 mAh/g of the theoretical capacity value of the graphite, and exhibits almost no increase as compared with natural graphite before an oxidizing treatment studied by the present inventors.

The object of the present invention is to solve the above-mentioned problem, that is, to provide a negative electrode carbon material capable of providing a lithium secondary battery improved in the capacity characteristic, and a negative electrode for a lithium secondary battery, and a lithium secondary battery using the negative electrode carbon material.

Solution to Problem

According to studies by the present inventors, it has been found that by carrying out a second heat treatment in an inert gas atmosphere after a first heat treatment in an oxidizing atmosphere, the capacity having largely decreased recovers nearly to a capacity value of the graphite before the first heat treatment. It has also been found that by coating graphite with amorphous carbon and then subjecting the graphite to the first and second heat treatments, the capacity can be improved nearly to the theoretical capacity of the graphite. It has further been found that by carrying out the first and second heat treatments, battery characteristics such as the rate characteristic can be improved largely.

According to one aspect of the present invention, there is provided a method for producing a negative electrode carbon material for a lithium secondary battery, the method comprising a first heat treatment of heat treating a graphite particle in an oxidizing atmosphere, and following the first heat treatment, a second heat treatment of heat treating the graphite particle in an inert atmosphere at a higher temperature than in the first heat treatment.

According to another aspect of the present invention, there is provided a negative electrode carbon material for a lithium secondary battery, comprising a graphite particle coated on the surface with a first amorphous carbon film, wherein the negative electrode carbon material has a cavity continuing from the first amorphous carbon film to a surface layer of the graphite particle.

Further according to still another aspect of the present invention, there is provided a negative electrode for a lithium secondary battery comprising the above negative electrode carbon material or a negative electrode carbon material produced by the above method. According to yet another aspect of the present invention, there is provided a lithium secondary battery comprising the above negative electrode.

Advantageous Effects of Invention

According to exemplary embodiments, there can be provided a negative electrode carbon material capable of providing a lithium secondary battery large in the initial capacity and improved in battery characteristics such as the rate characteristic, and a negative electrode for a lithium secondary battery and a lithium secondary battery using the negative electrode carbon material.

BRIEF DESCRIPTION OF DRAWINGS

FIG. 1 is a schematic cross-sectional diagram of graphite to become a negative electrode carbon material. FIG. 1(a) illustrates untreated graphite, and FIG. 1(b) illustrates graphite that applies the present invention.

FIG. 2 is SEM images showing surface states of untreated graphite particles (Comparative Example 1). FIG. 2(a) shows one example at 4,500×, and FIG. 2(b) shows another example at 4,000×.

FIG. 3 is SEM images showing surface states of graphite particles (Reference Example 1) after a first heat treatment. FIG. 3(a) and FIG. 3(b) are examples at 5,000×; FIG. 3(c) is an example at 10,000×; and FIG. 3(d) is an example at 20,000× of a part of FIG. 3(c).

FIG. 4 is SEM images showing surface states of graphite particles (Example 2) in which graphite particles are coated with an amorphous carbon film and then subjected to a first heat treatment. FIG. 4(a) and FIG. 4(c) are examples at 3,500×; FIG. 4(b) is an example at 10,000× of a part of FIG. 4(a); and FIG. 4(d) is an example at 20,000× of a part of FIG. 4(c).

FIG. 5 is diagrams indicating XRD data of a graphite particle (Reference Example 1) after a first heat treatment and a graphite particle (Example 1) after a second heat treatment.

FIG. 6 shows SEM images of negative electrode carbon materials obtained in Examples 4 to 6.

FIG. 7 shows SEM images at a high magnification of Example 6.

FIG. 8 shows results of Rutherford backscattering spectrometry of negative electrode carbon materials obtained in Comparative Example 2 and Example 4.

FIG. 9 shows results of Raman spectroscopy of negative electrode carbon materials obtained in Comparative Example 2 and Examples 4 to 6.

FIG. 10 shows FT-IR spectra of negative electrode carbon materials obtained in Comparative Example 2 and Examples 4 to 6.

FIG. 11 shows charge and discharge curves of negative electrode carbon materials obtained in Comparative Example 2 and Examples 4 to 6.

FIG. 12 shows charge rate characteristics of negative electrode carbon materials obtained in Comparative Example 2 and Examples 4 to 6 with a coated amount of 50 g/m$^2$.

FIG. 13 shows discharge rate characteristics of negative electrode carbon materials obtained in Comparative Example 2 and Examples 4 to 6 with a coated amount of 50 g/m$^2$.

FIG. 14 shows charge rate characteristics of negative electrode carbon materials obtained in Comparative Example 2 and Examples 4 to 6 with a coated amount of 100 g/m$^2$.

FIG. 15 shows discharge rate characteristics of negative electrode carbon materials obtained in Comparative Example 2 and Examples 4 to 6 with a coated amount of 100 g/m$^2$.

FIG. 16 shows cycle characteristics in 1 C charge-0.1 C discharge of negative electrode carbon materials obtained in Comparative Example 2 and Examples 4 to 6.

FIG. 17 shows cycle characteristics in 3 C charge-0.1 C discharge of negative electrode carbon materials obtained in Comparative Example 2 and Examples 4 to 6.

DESCRIPTION OF EMBODIMENTS

First, there will be described methods for producing a negative electrode carbon material for a lithium secondary battery according to the present invention.

In the production method according to this exemplary embodiment, there is carried out a first heat treatment of heating a graphite in an oxidizing atmosphere. Here, the heat treatment in the oxidizing atmosphere is carried out at a temperature lower than the ignition temperature of the graphite. If the graphite ignites, the combustion makes the temperature control unable and the oxidizing treatment itself becomes difficult. Although the ignition temperature variously differs depending on the composition of the graphite, the temperature of the first heat treatment under normal pressure can be usually selected from a temperature range of 400 to 900° C. Further, the time of the first heat treatment is in the range of about 30 min. to 10 hours. The oxidizing atmosphere includes oxygen, carbon dioxide and air or the like. Further the oxygen concentration and pressure can suitably be regulated. In the first heat treatment in the state that the surface of the graphite particle is exposed, channels are formed in the graphite surface as described later. Hereinafter, the description of the exemplary embodiment will be made on a method for producing a negative electrode carbon material comprising first and second heat treatments in the state that the surface of the graphite particles is exposed.

In the production method according to the exemplary embodiment, following the first heat treatment, a second heat treatment in an inert gas atmosphere is carried out. The second heat treatment is carried out at a temperature higher than that of the first heat treatment, and the temperature can be usually selected from a temperature range of 800° C. to 1,400° C. under normal pressure. Further the second heat treatment is carried out in the state that the channels formed by the first heat treatment are exposed. The time of the second heat treatment is in the range of about 1 hour to 10 hours. The inert gas atmosphere can be made to be a rare gas atmosphere such as of Ar or a nitrogen gas atmosphere. After the second heat treatment, the graphite particles can be cleaned by carrying out water washing and drying. The first and second heat treatments can be carried out continuously in a same heating furnace. In this case, the oxidizing atmosphere of the first heat treatment is replaced by the inert gas, and then the temperature is raised to the temperature of the second heat treatment. Alternatively, two heating furnaces are continuously arranged and the first and second heat treatments can be separately carried out. Further between the first heat treatment and the second heat treatment, there can be a time interval, or other steps such as water washing and drying can be interposed, as long as these steps do not affect the surface state of the formed channels.

As a raw material graphite to be used in the exemplary embodiment, natural graphite and artificial graphite can be used. As the artificial graphite, there can be used conventional products obtained by graphitizing coke or the like. Alternatively, there can be used a graphitized material of mesophase spherules also called as mesocarbon microbeads (MCMB). The artificial graphite can also be used one having been subjected to a heat treatment in the range of 2,000 to 3,200° C. As such a raw material graphite, there can be used particulate ones from the viewpoint of the filling efficiency, the mixability, the formability and the like. The shape of the particle includes spheroidal, ellipsoidal and scalp (flake). A usual spheroidizing treatment can be carried out.

The average particle diameter of the raw material graphite is preferably 1 µm or larger, more preferably 2 µm or larger, and still more preferably 5 µm or larger, from the viewpoint of suppressing side-reactions during charge and discharge so as to suppress the decrease of the charge and discharge efficiency, and preferably 40 µm or smaller, more preferably 35 µm or smaller, and still more preferably 30 µm or smaller, from the viewpoint of the input and output characteristic and the viewpoint of fabrication of an electrode (smoothness of an electrode surface, and the like). Here, the average particle diameter means a particle diameter (median diameter: $D_{50}$) at a cumulative value of 50% in a particle size distribution (in terms of volume) by a laser diffraction scattering method. Further the weight loss by the first heat treatment is not large, and the particle size distribution becomes nearly the same one also after the first heat treatment.

BET specific surface area (based on a measurement at 77K using a nitrogen adsorption method) of the raw material graphite is preferably smaller than 10 $m^2/g$, and more preferably 5 $m^2/g$ or smaller.

The above first and second heat treatments form a plurality of grooves (channels) in the surface of the graphite particles. Here, the channels include those formed by being mutually connected. The channels are formed from the surface of the graphite particles to various depths, and it is more preferable that the channels be formed particularly from the surface of a layered structure of graphene (hereinafter, referred to as graphene layers) to certain depth toward the inside thereof. These channels can pass through lithium ions (Li ions), and can function as paths of Li ions (Li paths) into graphene interlayers. In conventional graphite, Li paths of Li ions into graphene interlayers are almost limited to paths from the edge surface-sides of graphene layers, and the distance to reach interior of the graphene layers (center in the graphene layer plane direction) is long. Hence, when the reaction amount of lithium becomes large, the input characteristic lowers. In the production method according to the exemplary embodiment, since in addition to the Li paths from the edge surface-sides, the channels functioning as Li paths can be formed in the graphene layer planes (basal surfaces), Li paths increase and length of paths reaching the interior of the graphene layers become short. Consequently, the input characteristic of a lithium secondary battery can be improved.

It is preferable that such channels be formed so as to penetrate several layers of graphenes; it is more preferable that the channels be formed across the depth of at least 3 layers from the surface layer to the inside; it is still more preferable that the channels be formed across the depth of at least 5 layers from the surface layer to the inside; and the channels reaching the depth of more layers (for example, 10 or more layers) can be formed. Further, since the graphite is a conglomerate of a plurality of graphene layers, the channels can be formed so as to partially penetrate the plurality of graphene layers. When such channels are formed, Li paths reaching the interior in the stacking direction (the perpendicular direction to the graphene layer planes) of the graphene are formed and the input characteristic can be further improved. The depth of the channels (sometimes becoming a cavity state) in the interior graphene layer planes can be observed by cutting a negative electrode carbon material by any method, exposing a cross-section thereof, and observing the cross-section by an electron microscope such as TEM or SEM.

FIG. 1 is a diagram for explaining the present invention schematically. FIG. 1(a) shows a schematic cross-sectional view of untreated graphite, and FIG. 1(b) shows a schematic cross-sectional view of graphite having been subjected to a heat treatment by the present invention. Graphite has usually a form like a cabbage in which graphene is folded in many folds as shown in FIG. 1(a). In the surface layer (basal plane) of the graphite particle, fine holes (micropores), which are not illustrated, are formed, but the micropores are etched by a heat treatment in an oxidizing atmosphere and large holes are formed (FIG. 1(b)). As the holes, surface channels 1 are formed in the basal plane, and boreholes 2 (also called blind holes or drill holes) are formed in the interior, in some cases. The surface channel 1 and the borehole 2 may be continuous.

The opening width of these channels is not especially limited as long as being able to pass through lithium ions and not greatly degrading characteristics of the graphite due to the channel formation, but is preferably of a nanometer to micrometer size. Here, the nanometer size means a few nanometers (including 1 nm) to a few tens of nanometers (less than 50 nm); and the micrometer size means a few micrometers (including 1 µm) to a few tens of micrometers (less than 50 µm). For example, from the viewpoint of making lithium ions sufficiently pass through the holes, the opening width is preferably 10 nm or larger, more preferably 50 nm or larger, and still more preferably 100 nm or larger. Further from the viewpoint of not degrading the characteristics of the graphite, the opening width is preferably 1 µm or smaller, more preferably 800 nm or smaller, and still more preferably 500 nm or smaller. Here, the "opening width" means a width in the short direction of the channel.

Further, it is preferable that the channels are formed over the entire surface of the graphite particle, and it is more preferable the distribution thereof more uniform. The opening width, the distribution and the like of the channels can be controlled by the heat treating conditions such as temperature, time, oxygen concentration and the like in the first heat treatment.

The channels thus formed in the graphite surface differ from voids intrinsic to graphite (voids among primary particles, defects, and voids and cracks in the edge vicinity). Even if ordinal graphite having such intrinsic voids is used for a negative electrode, the input characteristic of a lithium secondary battery is low. Further, even if a graphite after being subjected to a treatment of roughening the surface of the graphite (for example, after being immersed in an alkali solution, being subjected to a treatment of irradiating ultrasonic waves) is used for a negative electrode, the input characteristic of a lithium secondary battery is low.

In the case where the first heat treatment alone is carried out, although the high capacity characteristic intrinsic to graphite is impaired, the second heat treatment in an inert gas can recover the capacity characteristic and improve the characteristics of a lithium secondary battery.

The negative electrode carbon material after the formation of the channels in such a manner according to the exemplary embodiment can have a structure and physical properties corresponding to a graphite as a raw material. The interlayer spacing $d_{002}$ of the (002) planes of the negative electrode carbon material according to the exemplary embodiment is preferably 0.340 nm or smaller, and more preferably 0.338 nm or smaller; and since the theoretical value of $d_{002}$ of graphite is 0.3354 nm, $d_{002}$ of the negative electrode carbon material according to the exemplary embodiment is preferably in the range of 0.3354 to 0.340 nm. The $d_{002}$ can be determined by X-ray diffractometry (XRD). Lc is preferably 50 nm or larger, and more preferably 100 nm or larger.

The production method according to the exemplary embodiment can comprise a process of forming a metal or its oxide alloyable with lithium (Li) on the graphite surface after the first and second heat treatments. The metal or the metal oxide is capable of reacting with lithium, and is electrochemically active in charge and discharge of a lithium secondary battery. As such a metal or metal oxide, there can be used at least one metal selected from the group consisting of Si, Ge, Sn, Pb, Al, Ga, In and Mg, or an oxide thereof.

The formation of such a metal or metal oxide enables the increase of the reaction capacity. Particularly the formation of a metal or metal oxide in the channel circumference enables the metal or metal oxide to more strongly bond with graphene layers in the channel circumference than in other sites, and thus can increase Li reaction sites excellent in reversibility to improve the reaction capacity.

Forming means of such a metal or metal oxide includes CVD, sputtering, electroplating, electroless plating and a hydrothermal synthesis method.

The content of the metal or metal oxide is preferably 0.1 to 30% by mass with respect to the graphite. When the content is too low, a sufficient incorporation effect cannot be attained; and when the content is too high, the influence of the volume expansion and contraction during charge and discharge of the metal or metal oxide becomes large and the negative electrode carbon material is likely to deteriorate.

The graphite-based material according to the present exemplary embodiment can be coated with an amorphous carbon. The amorphous carbon can suppress side-reactions of the graphite with an electrolyte solution to be able to improve the charge and discharge efficiency and increase the reaction capacity. The above-mentioned negative electrode carbon material having a metal alloyable with lithium (Li) or an oxide thereof formed on the material surface can also be coated with an amorphous carbon. Thereby, the reaction capacity can be more increased while side-reactions with an electrolyte solution are suppressed.

A method for coating an amorphous carbon on the negative electrode carbon material includes a hydrothermal synthesis method, CVD and sputtering. The coating of the amorphous carbon can be carried out after the first and second heat treatments.

The coating of the amorphous carbon by the hydrothermal synthesis method can be carried out, for example, as follows. First, a powder of negative electrode carbon materials having a cavity formed therein is immersed and mixed in a carbon precursor solution. Thereafter, the powder is separated by vacuum filtration. Then, the separated powder is subjected to a heat treatment in an inert atmosphere. Then, the obtained aggregates of the powder are crushed and classified into a desired particle size. As the carbon precursor solution, various types of sugar solutions can be used, and particularly a sucrose aqueous solution is preferable. The sucrose concentration of the aqueous solution can be set to be 0.1 to 6 M, and the immersion time can be set to be 1 min. to 24 hours. The heat treatment can be carried out in an inert atmosphere such as nitrogen or argon at 400 to 1,200° C. for 0.5 to 24 hours.

Further in another exemplary embodiment, the first and second heat treatments can be carried out after an amorphous carbon (referred to as a first amorphous carbon) is coated on the graphite. Comparing graphite high in the crystallinity with amorphous carbon, facility of being oxidized is usually higher in the graphite. Hence, the first amorphous carbon serves a function of a protection layer, and channels, which would be formed in the case where graphite is directly oxidized, are rarely formed. That is, vacancies are first formed in the first amorphous carbon film, and the graphite exposed in the vacancies is further oxidized and the vacancies extend into the graphite. Therefore, there are formed vacancies continuing in the first amorphous carbon film and the graphite. That is, in another exemplary embodiment, there is provided a negative electrode carbon material for a lithium secondary battery comprising a graphite particle coated with a first amorphous carbon film on its surface, wherein the coated graphite particle has vacancies continuing from the first amorphous carbon film to the surface layer of the graphite particle. Here, the first amorphous carbon does not completely coat the graphite surface in some cases. In this case, since uncoated portions of the graphite are directly oxidized and a plurality of channels is formed in the uncoated portions thereof, the cannels cannot be said to be continuous vacancy. Further, since the first amorphous carbon is more hardly oxidized than the graphite, the first heat treatment (oxidizing treatment) at a comparatively high temperature is allowed. The first heat treatment is carried out preferably at 500° C. or higher, more preferably at 600° C. or higher, and especially preferably at 700° C. or higher. The upper limit temperature is 900° C. or lower. The second heat treatment is carried out in the range of 800 to 1,400° C., which is the same as in the above.

The vacancies thus formed become Li paths into graphene interlayers as in the above channels, and the input characteristic can be improved. Further, the first amorphous carbon can more increase the reaction capacity while suppressing side reactions with an electrolyte solution. The opening size of these vacancies is not especially limited as long as they are able to cause lithium ions to pass through and do not greatly deteriorate characteristics of the carbon material due to the vacancy formation, but is preferably 10 nm or larger, more preferably 50 nm or larger, and still more preferably 100 nm or larger. Further from the viewpoint of not deteriorating the characteristics of the carbon material, the opening size is preferably 1 μm or smaller, more preferably 800 nm or smaller, and still more preferably 500 nm or smaller. Here, the "opening size" means a maximum length of an opening (maximum opening size), and corresponds to a diameter of a circle having a minimum area being able to accommodate the contour of the opening. Further, from the viewpoint of lithium ion passing, also an opening size (minimum opening size) corresponding to a diameter of a circle having a maximum area being able to be present on the inner side of the contour of the opening is preferably 10 nm or larger, more preferably 50 nm or larger, and still more preferably 100 nm or larger.

The depth of the vacancies is, as in the above-mentioned channels, preferably a depth of 3 or more layers of graphene of the graphite surface, and more preferably that of 5 or more layers. In addition to the vacancies formed continuously from the carbon material surface, vacancies penetrating a plurality of graphene layers are formed in the interior in some cases.

On the negative electrode carbon material thus having vacancies continuing from the first amorphous carbon film to the graphite particle surface layer, there may be formed the above-mentioned metal or its oxide alloyable with lithium (Li). The negative electrode carbon material having continuous vacancies, or the negative electrode carbon material having such a metal or metal oxide formed thereon may further be coated with a film of an amorphous carbon (second amorphous carbon).

The negative electrode carbon material described hitherto can be applied to a negative electrode active material of a lithium ion secondary battery. By using the negative electrode carbon material as a negative electrode active material, a lithium ion secondary battery improved in the input characteristic can be provided.

A negative electrode for a lithium ion secondary battery can be fabricated, for example, by forming a negative electrode active material layer containing a negative electrode active material composed of the negative electrode carbon material, and a binder, on a negative electrode current collector. The negative electrode active material layer can be formed by a usual slurry applying method. Specifically, a slurry containing a negative electrode active material, a binder and a solvent is prepared, applied on a negative electrode current collector, dried, and as required, pressed to thereby obtain a negative electrode. An applying method of the negative electrode slurry includes a doctor blade method, a die coater method, and a dip coating method. A negative electrode may be obtained by in advance forming a negative electrode active material layer, and thereafter forming a thin film of aluminum, nickel or an alloy thereof as a current collector by a method of vapor deposition, sputtering or the like.

The binder for the negative electrode is not especially limited, but includes polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl (meth)acrylate, ethyl (meth)acrylate, butyl (meth)acrylate, (meth)acrylonitrile, isoprene rubber, butadiene rubber, and fluororubber. As the slurry solvent, N-methyl-2-pyrrolidone (NMP) and water can be used. In the case of using water as the solvent, further as a thickener, there can be used carboxymethyl cellulose, methyl cellulose, hydroxymethyl cellulose, ethyl cellulose, or polyvinyl alcohol.

The content of the binder for the negative electrode is preferably in the range of 0.1 to 30 parts by mass with respect to 100 parts by mass of a negative electrode active material, more preferably in the range of 0.5 to 25 parts by mass, and still more preferably in the range of 1 to 20 parts by mass, from the viewpoint of the binding capability and the energy density, which are in a tradeoff relationship.

The negative electrode current collector is not especially limited, but, from the electrochemical stability, is preferably copper, nickel, a stainless steel, molybdenum, tungsten, tantalum or an alloy containing two or more thereof. The shape includes a foil, a flat plate and a mesh form.

A lithium ion secondary battery according to the present exemplary embodiment comprises the negative electrode, a positive electrode and an electrolyte.

A positive electrode can be fabricated, for example, by preparing a slurry containing a positive electrode active material, a binder and a solvent (further as required, a conductive auxiliary agent), applying the slurry on a positive electrode current collector, drying, and as required, pressing the resultant to thereby form a positive electrode active material layer on the positive electrode current collector.

As the positive electrode active material, but it is not especially limited, for example, a lithium composite oxide, an iron lithium phosphate and the like can be used. The lithium composite oxide includes lithium manganate ($LiMn_2O_4$); lithium cobaltate ($LiCoO_2$); lithium nickelate ($LiNiO_2$); compounds in which at least a part of manganese, cobalt or nickel of these lithium compounds is substituted with another metal element such as aluminum, magnesium, titanium or zinc; nickel-substituted lithium manganates in which a part of manganese of lithium manganate is substituted at least with nickel; cobalt-substituted lithium nickelates in which a part of nickel of lithium nickelate is substituted at least with cobalt; compounds in which a part of manganese of the nickel-substituted lithium manganates is substituted with another metal (for example, at least one of aluminum, magnesium, titanium and zinc); and compounds in which a part of nickel of the cobalt-substituted lithium nickelates is substituted with another metal (for example, at least one of aluminum, magnesium, titanium and zinc). These lithium composite oxides can be used singly or as a mixture of two or more. With respect to the average particle diameter of the positive electrode active material, the positive electrode active material having an average particle diameter, for example, in the range of 0.1 to 50 μm can be used, from the viewpoint of the reactivity with an electrolyte solution and the rate characteristic; the positive electrode active material having an average particle diameter in the range of 1 to 30 μm can be preferably used; and the positive electrode active material having an average particle diameter in the range of 5 to 25 μm can be more preferably used. Here, the average particle diameter means a particle diameter (median diameter: $D_{50}$) at a cumulative value of 50% in a particle size distribution (in terms of volume) by a laser diffraction scattering method.

As the binder for the positive electrode, but it is not especially limited, the same ones as the binders for the negative electrode can be used. Among these, from the viewpoint of the versatility and the low cost, polyvinylidene fluoride is preferable. The content of the binder for the positive electrode is preferably in the range of 1 to 25 parts by mass with respect to 100 parts by mass of a positive electrode active material, more preferably in the range of 2 to 20 parts by mass, and still more preferably in the range of 2 to 10 parts by mass, from the viewpoint of the binding capability and the energy density, which are in a tradeoff relationship. Binders other than polyvinylidene fluoride (PVdF) include vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide. As a slurry solvent, N-methyl-2-pyrrolidone (NMP) can be used.

As the positive electrode current collector, but it is not especially limited, there can be used, for example, aluminum, titanium, tantalum, stainless steel (SUS), another valve metal or an alloy thereof from the viewpoint of the electrochemical stability. The shape includes a foil, a flat plate shape and a mesh form and the like. Particularly an aluminum foil can suitably be used.

When a positive electrode is fabricated, a conductive auxiliary agent may be added for the purpose of reducing the impedance. The conductive auxiliary agent includes fine particles of carbonaceous material such as graphite, carbon black, acetylene black or the like.

As the electrolyte, there can be used a nonaqueous electrolyte solution in which a lithium salt is dissolved in one or two or more nonaqueous solvents. The nonaqueous solvent is not especially limited, but examples thereof include cyclic carbonates such as ethylene carbonate (EC), propylene carbonate (PC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylate esters such as methyl formate, methyl acetate and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyltetrahydrofuran. As the nonaqueous solvents, additionally, there may be used aprotic organic solvents such as dimethyl sulfoxide, 1,3-dioxolane, dioxolane derivatives, formamide, acetamide, dimethyl formamide, acetonitrile, propionitrile, nitromethane, ethyl monoglyme, phosphate triesters, trimethoxymethane, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole and N-methylpyrrolidone.

Examples of the lithium salt dissolved in the nonaqueous solvent, but it is not especially limited, include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$ and lithium bisoxalatoborate. These lithium salts can be used singly or in a combination of two or more. A polymer electrolyte can also be used in place of the nonaqueous electrolyte solution.

A separator can be provided between the positive electrode and the negative electrode. As the separator, there can be used a porous film, a woven fabric or a nonwoven fabric composed of a polyolefin such as polypropylene or polyethylene, a fluororesin such as polyvinylidene fluoride, a polyimide, or the like.

The battery shape includes a cylinder shape, a rectangular shape, a coin type, a button type and a laminate type. In the case of the laminate type, as an outer package accommodating the positive electrode, the separator, the negative electrode and the electrolyte, a laminate film is preferably used. The laminate film contains a resinous base, a metal foil layer and a heat sealable layer (sealant). The resinous base includes polyester and nylon; the metal foil layer includes aluminum, aluminum alloy and titanium foils; and the material of the heat sealable layer includes thermoplastic polymer materials such as polyethylene, polypropylene and polyethylene terephthalate. The resinous base layer and the metal foil layer each are not limited to of one layer, but may be of two or more layers. From the viewpoint of the versatility and the cost, an aluminum laminate film is preferable.

The positive electrode, the negative electrode, and the separator disposed therebetween are accommodated in an outer package container composed of a laminate film or the like; and an electrolyte solution is put thereinto and sealed. It can be made a structure in which an electrode assembly of which a plurality of electrode pairs are stacked is accommodated in the package container.

EXAMPLES

The present invention will be described further by way of Examples hereinafter.

Reference Example 1

A natural graphite powder (spherical graphite) of 20 μm in average particle diameter and 5 $m^2/g$ in specific surface area was subjected to a first heat treatment alone in air at 480° C. for 1 hour to thereby obtain a negative electrode carbon material.

Example 1

A natural graphite powder (spherical graphite) of 20 μm in average particle diameter and 5 $m^2/g$ in specific surface area was subjected to a first heat treatment in air at 480° C. for 1 hour, and then, to a second heat treatment in a nitrogen atmosphere at 1,000° C. for 4 hours to thereby obtain a negative electrode carbon material.

Example 2

A natural graphite powder (spherical graphite) of 24 μm in average particle diameter and 5 $m^2/g$ in specific surface area was coated with an amorphous carbon by CVD (acetylene gas, 620° C., 20 min). Thereafter, the resultant was subjected to a first heat treatment in air at 650° C. for 1 hour, and then, to a second heat treatment in a nitrogen atmosphere at 1,000° C. for 4 hours to thereby obtain a negative electrode carbon material.

Example 3

A natural graphite powder (spherical graphite) of 24 μm in average particle diameter and 5 $m^2/g$ in specific surface area was coated with an amorphous carbon by CVD (acetylene gas, 620° C., 20 min). Thereafter, the resultant was subjected to a first heat treatment in air at 700° C. for 1 hour, and then, to a second heat treatment in a nitrogen atmosphere at 1,000° C. for 4 hours to thereby obtain a negative electrode carbon material.

Comparative Example 1

The same natural graphite powder of 20 μm in average particle diameter and 5 $m^2/g$ in specific surface area as in Example 1 was prepared, and was used as it was as a negative electrode carbon material.

(Observation of the Surface of the Negative Electrode Carbon Materials)

In Reference Example 1, the graphite powder (Reference Example 1) separated by vacuum filtration before the oxidizing treatment was observed by a scanning electron microscope (SEM). Its SEM image is shown in FIG. 2. Further, its SEM image after the oxidizing treatment is shown in FIG. 3. As can be seen from a comparison of FIG. 2 and FIG. 3, it is clear that a plurality of channels was formed over the entire graphite particle surface. Here, SEM images were observed similarly for the negative electrode carbon material of Example 1, and the observed situation was nearly the same as in Reference Example 1, and no change in the opening width of the channels was observed.

Furthermore, SEM images of the negative electrode carbon material of Example 2 having been coated with the amorphous carbon film and then subjected to the first and second heat treatments are shown in FIG. 4. Comparing with the case of FIG. 3, it is clear that almost no channels were formed in the surface, and vacancies formed in the amorphous carbon film further extended continuously into the graphite particle surface layer.

(Measurement of the Crystal Structures of the Negative Electrode Carbon Materials)

The crystal structures of the graphite powders of Example 1 and Reference Example 1 were measured by X-ray diffractometry (XRD). The obtained XRD patterns are shown in FIG. 5. As shown in this figure, the crystallinity of the graphite particle was improved by the second heat treatment. As shown in the partially enlarged diagram, the peak shifted to a low angle side. This indicates that the graphene interlayer distance expanded by the second heat treatment. Generally speaking, the larger the interlayer distance, the more the input rate characteristic is improved. Here, the XRD pattern of Example 1 is shown by raising its base line for convenience.

(Charge and Discharge Test)

A negative electrode carbon material, a conductive agent (carbon black) and a binder (PVdF) were mixed in a mass ratio of negative electrode carbon material:conductive agent:binder=92:1:7, and dispersed in NMP to thereby fabricate a slurry. The slurry was applied on a copper foil, dried and rolled, and thereafter the resultant was cut into 22×25 mm to thereby obtain an electrode. The electrode as a working electrode (negative electrode) was combined with a Li foil of a counter electrode (positive electrode) with a separator interposed therebetween to thereby obtain a laminate. The laminate and an electrolyte solution (a mixed solution of EC and DEC containing 1 M $LiPF_6$, volume ratio of EC/DEC=3/7) were sealed in an aluminum laminate container to thereby fabricate a battery.

At predetermined current values, charge (Li was intercalated in the working electrode) was carried out up to 0 V of the potential of the working electrode against the counter electrode, and discharge (Li was deintercalated from the working electrode) was carried out up to 1.5 V. With respect to the current values during the charge and discharge, a current value at which a discharge capacity of the working electrode was allowed to flow by taking 1 hour was taken as 1 C, and the charge and the discharge of the first cycle and the second cycle were carried out in 0.1 C charge-0.1 C discharge; and those of the third cycle, in 1 C charge-0.1 C discharge.

As charge and discharge characteristics, the initial discharge capacity (discharge capacity of the first cycle), the initial efficiency (discharge capacity of the first cycle/charge capacity of the first cycle) and the charge rate characteristic (discharge capacity of the third cycle/discharge capacity of the second cycle) were determined. The results are shown in Table 1.

TABLE 1

|  | Initial Capacity (mAh/g) | Initial Efficiency (%) | Charge Rate Characteristic 1 C/0.1 C |
| --- | --- | --- | --- |
| Reference Example 1 | 300.5 | 92.9 | 14.0% |

TABLE 1-continued

|  | Initial Capacity (mAh/g) | Initial Efficiency (%) | Charge Rate Characteristic 1 C/0.1 C |
| --- | --- | --- | --- |
| Example 1 | 328.0 | 92.4 | 24.4% |
| Example 2 | 370.7 | 93.0 | 28.7% |
| Example 3 | 366.5 | 91.7 | 35.7% |
| Comparative Example 1 | 330.0 | 91.3 | 11.0% |

As can be seen from Table 1, performing the oxidizing heat treatment (first heat treatment) on the graphite particle slightly improved the charge rate characteristic, but largely reduced the initial capacity (Reference Example 1). Thereafter, performing the heat treatment (second heat treatment) in a nitrogen gas atmosphere recovered the initial capacity nearly to that before the oxidation (Comparative Example 1), and largely improved the charge rate characteristic as well (Example 1). Moreover, performing the first and second heat treatments after the coating of the amorphous carbon can provide the negative electrode carbon material excellent further in the initial capacity and excellent in the charge rate characteristic as well (Examples 2 and 3).

Comparative Example 2

The same natural graphite powder of 20 μm in average particle diameter and 5 $m^2/g$ in specific surface area as in Example 1 was prepared, and was coated with an amorphous carbon (about 10 nm in thickness) by CVD (acetylene gas, 620° C., 20 min). The resultant was used as a negative electrode carbon material.

Example 4

The amorphous carbon-coated natural graphite particle obtained in Comparative Example 2 was subjected to a first heat treatment in an atmosphere of $O_2:N_2=1:4$ (volume ratio) at 650° C. for 1 hour, and then subjected to a second heat treatment in a nitrogen atmosphere at 1,000° C. for 4 hours to thereby obtain a negative electrode carbon material.

Example 5

The amorphous carbon-coated natural graphite particle obtained in Comparative Example 2 was subjected to a first heat treatment in an atmosphere of $O_2:N_2=1:4$ (volume ratio) at 750° C. for 1 hour, and then subjected to a second heat treatment in a nitrogen atmosphere at 1,000° C. for 4 hours to thereby obtain a negative electrode carbon material.

Example 6

The amorphous carbon-coated natural graphite particle obtained in Comparative Example 2 was subjected to a first heat treatment in an atmosphere of $O_2:N_2=1:4$ (volume ratio) at 850° C. for 1 hour, and then subjected to a second heat treatment in a nitrogen atmosphere at 1,000° C. for 4 hours to thereby obtain a negative electrode carbon material.

FIG. 6 shows SEM images of the negative electrode carbon materials obtained in Examples 4 to 6. Further, FIG. 7 shows high-magnification SEM images of Example 6. In FIG. 7(a), the state of channels in the basal plane can be confirmed; and in FIG. 7(b), holes penetrating a plurality of graphene layers can be confirmed.

The following Table 2 shows the specific surface area, the pore volume and the average pore diameter by a nitrogen gas adsorption method (BET method). In addition, Table 3 shows the specific surface area, the pore volume and the average pore diameter by a mercury penetration method. Here, the nitrogen gas adsorption method can check the microscopic state of pores from micropores (2 nm or smaller) to mesopores (100 nm or smaller), which can be measured, for example, according to ISO 15901-2 (JIS Z8831-2). The mercury penetration method can check the macroscopic state of macropores (larger than 100 nm), which can be measured, for example, according to ISO 15901-1. Usually, the specific surface area, as observed in active carbon, increases as more pores (holes) are formed in a carbon material surface. In Examples 4, 5 and 6, the pore volume increased and the average pore diameter also became large. The BET specific surface area was likely to reduce as the air oxidizing temperature became higher. This is because micropores, which were smaller, were broken by the surface oxidation and mesopores, which were larger, or macropores, which were further larger, were formed. Particularly since the carbon material of Comparative Example 2 had a high proportion of micropores, the coulombic efficiency and the cycle characteristics were adversely affected; but the reduction of the micropores could eliminate these disadvantages.

TABLE 2

| Carbon Material | BET Specific Surface Area (m²/g) | Pore Volume (cm³/g) | Average Pore Diameter (nm) |
|---|---|---|---|
| Comparative Example 2 | 9.5 | 0.01 | 4.7 |
| Example 4 | 9.4 | 0.03 | 9.8 |
| Example 5 | 9.2 | 0.03 | 10.2 |
| Example 6 | 8.6 | 0.03 | 10.0 |

TABLE 3

| Carbon Material | Specific Surface Area by Mercury Penetration Method (m²/g) | Pore Volume (cm³/g) | Average Pore Diameter (μm) |
|---|---|---|---|
| Comparative Example 2 | 3.1 | 0.67 | 0.9 |
| Example 4 | 2.2 | 0.84 | 1.5 |
| Example 5 | 2.7 | 0.80 | 1.2 |
| Example 6 | 3.0 | 0.77 | 1.1 |

FIG. 8 shows proportions of oxygen atoms in the depth direction in the carbon material surfaces of Comparative Example 2 and Example 4 as measured by Rutherford Backscattering Spectrometry (RBS). In FIG. 8, lower than 0.001 atomic % is below the detection limit. The depth from the surface containing 0.001 atomic % or more of oxygen was about 28 nm for Comparative Example 2, whereas the oxygen distribution became as shallow as about 23 nm in Example 4. In the present invention, it is preferable that the depth from the surface containing 0.001 atomic % or more of oxygen be 25 nm or shallower, and in consideration of spontaneous oxidation, oxygen is contained in the range of 1 nm or deeper. When the oxygen distribution is in this range, the initial charge and discharge efficiency is improved.

Table 4 shows elemental composition analysis results in the surfaces of the carbon materials of Comparative Example 2 and Examples 5 and 6 by X-ray photoelectron spectroscopy (XPS). The oxygen amounts in the carbon material surfaces reduced to 1.1 atomic % or smaller by the air oxidizing treatment at 750° C. or higher and the nitrogen heat treatment.

TABLE 4

| Carbon Material | Elemental Composition (Atomic %) | | | |
|---|---|---|---|---|
| | C | O | Na | S |
| Comparative Example 2 | 98.2 | 1.6 | 0.1 | 0.1 |
| Example 5 | 98.8 | 1.1 | 0.1 | — |
| Example 6 | 99.1 | 0.9 | — | — |

Further, Raman spectra results of the obtained carbon materials are shown in FIG. 9. It shows that the intensity ratio (R value) $I_D/I_G$ of a D peak reflecting the disorder in graphite to a G peak reflecting the graphite structure thereof reduced after the surface oxidizing treatment, and crystallinity improved.

In addition, Table 5 shows measurement results of the number of localized electrons and the number of carriers in the carbon material surfaces by an electron spin resonance method (ESR). The localized electrons increased and the carriers decreased by the air oxidizing and nitrogen heat treatments; this is conceivably because micropores reduced and the crystallinity improved.

TABLE 5

| Carbon Material | Localized Electron (Number/g) | Carrier (Number/g) |
|---|---|---|
| Comparative Example 2 | 3.8E+17 | 5.8E+18 |
| Example 4 | 4.2E+17 | 4.8E+18 |
| Example 5 | 4.4E+17 | 3.8E+18 |
| Example 6 | 4.8E+17 | 2.9E+18 |

FIG. 10 shows FT-IR spectrum of the each carbon material. There were no large changes in the peak intensity and the peak position before and after the surface oxidizing treatment. This indicates that the surface oxidizing treatment did not add any functional groups advantageous to the coulombic efficiency and the cycle characteristics on the carbon material surfaces.

FIG. 11 shows charge and discharge curves when the each carbon material was used for a negative electrode. The surface oxidizing treatment more improved the discharge capacity and the coulombic efficiency (CE) than in the raw material carbon material (Comparative Example 2). Further, the discharge capacity was higher in the second-cycle discharge than in the first-cycle discharge; and when the surface oxidizing treatment temperature was higher, the shift width in the discharge capacity increased more.

FIG. 12 and FIG. 13 show, respectively, the charge rate characteristic of the each carbon material when a negative electrode was formed in a coating amount of 50 g/m², and the discharge rate characteristic thereof. FIG. 14 and FIG. 15 show, respectively, the charge rate characteristic of the each carbon material when the negative electrode was formed in a coating amount of 100 g/m², and the discharge rate characteristic thereof. Further, typical rate characteristics (1 C charge-0.1 C discharge, 6 C charge-0.1 C discharge, 10 C charge-0.1 C discharge) are shown in Table 6. The each rate characteristic (capacity retention) is a relative value with the capacity retention in 0.1 C charge-0.1 C discharge being taken to be 100%.

TABLE 6

| Carbon Material | Charge Rate Characteristic (%) (Upper: 50 g/m², Lower: 100 g/m²) | | | Discharge Rate Characteristic (%) (Upper: 50 g/m², Lower: 100 g/m²) | | |
|---|---|---|---|---|---|---|
| | 1 C/ 0.1 C | 6 C/0.1 C | 10 C/ 0.1 C | 1 C/0.1 C | 6 C/0.1 C | 10 C/ 0.1 C |
| Comparative Example 2 | 94 | 67 | 37 | 93 | 67 | 36 |
| | 88 | 19 | 2 | 93 | 22 | 11 |
| Example 4 | 96 | 77 | 51 | 93 | 72 | 41 |
| | 97 | 53 | 6 | 94 | 33 | 16 |
| Example 5 | 96 | 77 | 51 | 93 | 71 | 41 |
| | 96 | 55 | 14 | 95 | 35 | 17 |
| Example 6 | 97 | 77 | 53 | 93 | 72 | 42 |
| | 96 | 53 | 7 | 94 | 30 | 14 |

FIGS. 16 and 17 show the cycle characteristics of the each carbon material. FIG. 16 shows the cycle characteristics in 1 C charge-0.1 C discharge; and FIG. 17 shows the cycle characteristics in 3 C charge-0.1 C discharge.

It was confirmed that the amorphous carbon-coated natural graphite, when having an $I_D/I_G$ ratio (R value) of 0.15 or lower, became a negative electrode carbon material excellent in the capacity, the CE and the rate characteristic.

Comparative Example 3

A flaky artificial graphite (particle diameter: about 15 μm) was used as the carbon material. No amorphous carbon film was formed.

Example 7

The flaky artificial graphite of Comparative Example 3 was used, and subjected to a first heat treatment in an atmosphere of $O_2:N_2=1:4$ (volume ratio) at 650° C. for 1 hour, and then subjected to a second heat treatment in a nitrogen atmosphere at 1,000° C. for 4 hours to thereby obtain a negative electrode carbon material.

Example 8

The flaky artificial graphite of Comparative Example 3 was used, and subjected to a first heat treatment in an atmosphere of $O_2:N_2=1:4$ (volume ratio) at 850° C. for 1 hour, and then subjected to a second heat treatment in a nitrogen atmosphere at 1,000° C. for 4 hours to thereby obtain a negative electrode carbon material.

The capacity (mAh/h), the coulombic efficiency (CE: %) and the rate characteristics (1 C charge-0.1 C discharge, 4 C charge-0.1 C discharge, 6 C charge-0.1 C discharge, 10 C charge-0.1 C discharge) when a negative electrode was formed in a coating amount of the each carbon material of Comparative Example 3 and Examples 7 and 8 of 110 g/m² are shown in Table 7.

TABLE 7

| Carbon Material | Capacity (mAh/g) | Coating Amount (g/m²) | CE (%) | Rate Characteristic | | | |
|---|---|---|---|---|---|---|---|
| | | | | 1 C/ 0.1 C | 4 C/ 0.1 C | 6 C/ 0.1 C | 10 C/ 0.1 C |
| Comparative Example 3 | 303 | 110 | 93 | 91 | 55 | 32 | 4 |
| Example 7 | 311 | 110 | 93 | 92 | 60 | 39 | 7 |
| Example 8 | 320 | 110 | 93 | 95 | 59 | 38 | 8 |

It was confirmed that even in the case of the graphite having no amorphous carbon film formed thereon, the capacity thus increased and the rate characteristic is thus improved by applying the method according to the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Application No. 2014-63287, filed on Mar. 26, 2014, the disclosure of which is hereby incorporated herein in its entirety by reference.

What is claimed is:

1. A negative electrode carbon material for a lithium secondary battery, comprising a graphite particle having a first amorphous carbon film coated on a surface thereof,
   wherein the negative electrode carbon material has a cavity continuing from the first amorphous carbon film to a surface layer of the graphite particle, and
   wherein an opening size of the cavity continuing from the first amorphous carbon film to a surface layer of the graphite particle is in the range of 10 nm to 1 μm.

2. The negative electrode carbon material according to claim 1, wherein the cavity is formed by penetrating the first amorphous carbon film after coating the first amorphous carbon film on the surface of the graphite particle.

3. The negative electrode carbon material according to claim 1, wherein a surface layer of graphite particle comprises a plurality of graphene layers and, the cavity is formed so as to penetrate the plurality of graphene layers in the surface layer of the graphite particle.

4. The negative electrode carbon material according to claim 1, wherein in charge and discharge in potentials vs. lithium of from 0 to 2 V, the negative electrode carbon material exhibits a discharge capacity of 360 mAh/g or higher.

5. The negative electrode carbon material according to claim 1, wherein a metal or an oxide thereof alloyable with lithium is formed on the first amorphous carbon film and a surface of the graphite particle.

6. The negative electrode carbon material according to claim 1, wherein the negative electrode carbon material has a second amorphous carbon film coating a surface thereof.

7. A negative electrode for a lithium battery, comprising the negative electrode carbon material according to claim 1.

8. A lithium secondary battery, comprising the negative electrode according to claim 7.

* * * * *